United States Patent
Crowle

[19]

[11] Patent Number: 5,857,072
[45] Date of Patent: Jan. 5, 1999

[54] SYSTEM AND METHOD FOR DISTRIBUTING DATA SIMULTANEOUSLY TO MULTIPLE COMPUTERS ON A NETWORK, WITH ADVANCED NOTICE TO INTENDED RECIPIENTS

[75] Inventor: Nelson Fredrick Crowle, Spring Hill, Kans.

[73] Assignee: Sprint Communications Co. L.P., Kansas City, Mo.

[21] Appl. No.: 641,380
[22] Filed: Apr. 30, 1996
[51] Int. Cl.⁶ .................................................. G06F 12/14
[52] U.S. Cl. ............................... 395/200.33; 395/200.3; 395/200.31; 395/200.36; 395/200.56; 395/800.28; 395/800.31; 370/471; 370/474
[58] Field of Search .................... 364/DIG. 1; 370/471, 370/474; 395/200.33, 200.31, 800.28, 800.31, 200.3, 200.36, 200.56

[56] References Cited

U.S. PATENT DOCUMENTS

| | | | |
|---|---|---|---|
| 5,212,789 | 5/1993 | Rago | 395/600 |
| 5,522,070 | 5/1996 | Sumimoto | 395/674 |
| 5,634,127 | 5/1997 | Cloud et al. | 395/680 |
| 5,657,317 | 8/1997 | Mahany et al. | 370/338 |

*Primary Examiner*—Alyssa H. Bowler
*Assistant Examiner*—Dzung C. Nguyen
*Attorney, Agent, or Firm*—Harley R. Ball; Jed W. Caven

[57] ABSTRACT

A system and method for distributing data to multiple computer locations associated with a computer network determines which of the multiple network computer locations are to receive a data distribution, and then generates a first message indicating the data comprising the data distribution and the network computer locations intended to receive the data distribution. The first message and the data distribution are transmitted to the network such that each of the multiple network locations is capable of receiving the data distribution. The multiple network computer locations examine the first message so that each network computer location can determine whether it is an intended location for receiving the data distribution. Then, one or more intended network locations receive the data distribution.

30 Claims, 3 Drawing Sheets

SYSTEM AND METHOD FOR DISTRIBUTING DATA SIMULTANEOUSLY TO MULTIPLE COMPUTERS ON A NETWORK, WITH ADVANCED NOTICE TO INTENDED RECIPIENTS

FIELD OF THE INVENTION

The present invention relates to data distribution methodologies, and more particularly, to a system and method for distributing data to multiple computers on a network.

BACKGROUND OF THE INVENTION

Over the past several years, there has been a significant increase in the use of computer networks for data communications. Data communications networks were developed to allow users to share computer and information resources and to provide a common communications system. A communications network provides common transmission, multiplexing, and switching functions that enable users to transport data between many sources and many destinations. Under ideal circumstances, the data that arrives at the destination is identical to the data sent. With the wide use of computer networks in business and industry, there has been an increasing use of internetworking which allows users of one network to access and share the resources of computers and databases associated with other networks. At the present time, the Internet has rapidly become the internetwork of choice for millions of users.

Two commonly used categories of networks are Local Area Networks (LAN) and Wide Area Networks (WAN). LANs often parallel organizational structures. For example, a LAN may connect the computers of a single workgroup, all of the groups in a department on a floor of a building, or all of the departments of a division occupying an office building. By contrast, WANs are communication networks that are regional or nationwide in geographic area, with minimal distances typical of that between major metropolitan areas. Computers that are connected to a LAN or a WAN use data packets to communicate information. A packet contains a few hundred to a few thousand bytes of data and generally two addresses—a source address and a destination address.

In order for computers from different networks to communicate and share information, protocols have been established. Protocols are the conventions and procedures used by computers to communicate with each other. Protocols are used for multiple purposes such as to establish and remove connections, ensure reliable delivery, provide necessary information for delivery of information, and format the information for proper interpretation at the destination. One of the standard protocols currently in use, particularly in connection with the Internet, is the Transmission Control Protocol and Internet Protocol (TCP/IP). Another communication environment used in network computing is the Network Basic Input/Output System (NetBIOS). NetBIOS is a programming gateway to services that allow computer applications and devices to communicate. Typically, data exchange occurs between NetBIOS applications residing within separate machines connected by a LAN.

In the context of communications protocols, there are generally two types of operations for data communication: connectionless protocols and connection-oriented protocols. With connection-oriented operations, a user and a network establish a logical connection before the transfer of data occurs. Typically, some type of relationship is maintained between the data units being transferred through the user/network connection. With connectionless-mode operations, no logical connection between the user and the network is established prior to the data transmission. The data units are transmitted as independent units.

Connection-oriented service requires a three-way agreement between the two end users and the network. During the connection establishment, all three parties store information about each other, such as addresses and quality of service functions. Once data transfer begins, it is not necessary for Protocol Data Units (PDUs) to carry significant overhead Protocol Control Information (PCI). Instead, only an abbreviated identifier is needed to allow the parties to access necessary tables and look up the full addresses and quality of service features. Connection-oriented service also provides for the acknowledgment of all data units. Additionally, if problems occur during the transmission, a connection-oriented protocol provides mechanisms for the retransmission of the units in error. Moreover, most connection-oriented protocols ensure that the data arrives in the proper order at the final destination.

Connectionless operations manage user PDUs as independent and separate entities. No relationship is maintained between successive data transfers, and minimal records are maintained concerning the ongoing communications process through the network. In contrast to connection-oriented service, connectionless service provides neither positive acknowledgments nor negative acknowledgments regarding the data transmission. Thus, by its very nature, connectionless service can achieve significant independence from: (a) specific protocols within a subnetwork, (b) subnetworks from each other, and (c) subnetworks from user-specific protocols. Additionally, connectionless networks are not concerned with flow control or any type of resequencing operations at the final destination. Connectionless networks may also allow multiple copies of the same message to arrive via bridges. As noted, each PDU is handled as an independent entity such that data units can take different routes to avoid failed nodes or congestion at a point in the network. However, connectionless protocols do consume more overhead than their connection-oriented counterparts in relation to the length of the headers and in proportion to the amount of user data in the PDU.

Particularly in the context of organizational networks, data distribution systems are used to distribute files and maintain file version control within the networked computers. Several existing data distribution packages are available for this purpose, such as Frye Utilities for Networks, IBM NetView DM, Microsoft System Management Server, and Norton Administrator for Networks. These distribution packages operate on a variety of operating platforms such as DOS, Windows for Workgroups, Windows NT, OS/2, MacIntosh, etc. Moreover, certain of these distribution packages can operate on more than one transport protocol, including both NetBIOS and TCP/IP.

A significant limitation of each of the above-referenced file distribution packages relates to the method in which data is distributed. Specifically, in each of these distribution packages, all data is distributed to multiple client computers one at a time. Thus, data sent to one hundred client computers, for example, must be sent one hundred times (once to each computer) and thus takes one hundred times longer than would be required to send the data to one client computer. Consequently, when large numbers of client computers associated with the network require a data distribution, existing file distribution systems require a significant amount of network bandwidth and increased distribution time.

SUMMARY OF THE INVENTION

In view of the foregoing, it is the general aim of the present invention to provide data distribution to multiple network computers with increased speed and efficiency over existing distribution systems.

In accomplishing that aim, a primary object of the present invention is to send data simultaneously to multiple computer locations on a network.

A related object of the present invention is to provide a data distribution system and method that sends a single copy of data across a computer network which can be accepted by multiple network computers that are intended locations for the data distribution.

Another object of this invention is to simultaneously distribute both data files and program files to multiple intended network computer locations by sending only a single copy of the data and program files across the network.

Still another object of this invention is to provide such a data distribution system and method that can operate on a local area network or a wide area network.

These and other aims and objectives are accomplished with the system and method for distributing data to multiple computer locations associated with a computer network according to the present invention. The method of the present invention determines which of the multiple network computer locations are to receive a data distribution, and then generates a first message indicating the data comprising the data distribution and the network computer locations intended to receive the data distribution. The first message and the data distribution are transmitted to the network such that each of the multiple network locations is capable of receiving the data distribution. The multiple network computer locations examine the first message so that each network computer location can determine whether it is an intended location for receiving the data distribution. Then, one or more intended network locations receive the data distribution.

The present invention can also be characterized by a computer-readable memory having stored therein computer-executable program code for distributing data to multiple computer locations associated with a computer network. The computer-readable memory comprises structure for determining which of the multiple network computer locations are to receive a data distribution. A file header structure generates a file header message indicating the data comprising the data distribution and the network computer locations intended to receive the data distribution. The multiple network computer locations examine the file header message so that each network computer location can determine whether it is an intended location for receiving the data distribution. The computer-readable memory further includes a file record structure for transmitting the data distribution to the network such that a plurality of the multiple network computer locations are capable of receiving the data distribution. Based upon the data specified in the file header message, one or more of the intended network computer locations then receive the data distribution.

DETAILED DESCRIPTION OF THE PREFERRED EMBODIMENTS

Figure 1:
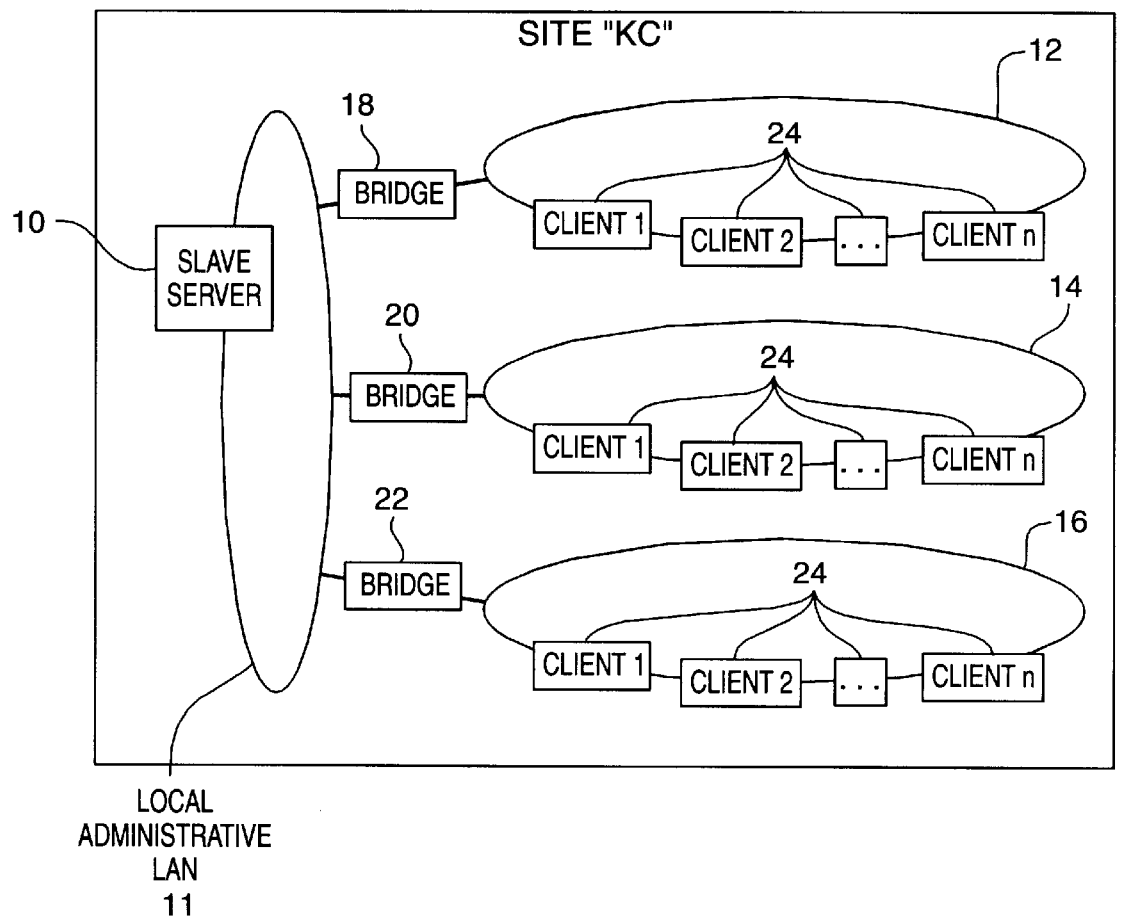
FIG. 1 is a diagram generally illustrating use of the data distribution system and method of the present invention in a local area network environment.

A data distribution system according to the present invention is designated in FIG. 1 by the reference numeral 10. As noted above, in contrast to existing data distribution systems which distribute data to multiple network computers one at a time, data distribution system 10 of the present invention sends one copy of the data to a computer network, with the data then being received by all appropriate network computers. As illustrated in FIG. 1, data distribution system 10 (also referred to herein as data server 10) is shown in a local area network (LAN) environment. More specifically, data server 10 operates in a local administrative LAN 11 which is connected to a plurality of physical LANs 12, 14 and 16 via bridges 18, 20 and 22, respectively. These components are all located at a site designated as Site "KC". As shown, each LAN 12, 14 and 16 includes a plurality of network computer locations referred to in FIG. 1 as clients 24. As described in further detail below, data server 10 is configured to distribute a single copy of data files or program files which are communicated to LANs 12, 14 and 16 via bridges 18, 20 and 22.

The data distribution system and method of the present invention maintains a listing of network addresses for network computers to whom it will distribute data. When directed to distribute data to a group of network client computers, data server 10 formulates a message specifying the particular clients that are to accept the data to follow. This message is sent to the network. All client computers connected to the network listen for this message and examine it to determine whether the particular client is an intended location for the data distribution. If the data is not intended for a particular network location, that network location ignores the data that follows. If, however, the data is intended for a particular network computer location, the data will be received and processed by that and all other intended network locations.

In order to distribute data to multiple network computer locations simultaneously, the data distribution system and method 10 of the present invention utilizes a connectionless broadcasting technique to send a single copy of data on a network. A connectionless datagram is not acknowledged by an individual network computer. Therefore, additional logic is required to determine whether a particular network computer location has successfully received the data. As described in further detail below, data server 10 sends a message after initially distributing the data requesting all network computer locations to respond with a list of the data that has been received successfully. Data server 10 then receives individual responses from each intended network computer location, and compiles a list of the network locations that received data successfully and the locations that must be reattempted.

Data distribution system 10 of the present invention utilizes broadcast datagrams to communicate with client locations. These broadcast datagrams are supported in two of the major networking transport protocols: NetBIOS and IP. NetBIOS uses standard datagrams to "group" names (each client "adds" the same group name, so when a message is sent to the group name, all clients receive the message). IP uses the UDP (User Datagram Protocol) protocol (not TCP/IP, but supported on the same network) to send connectionless socket datagrams.

Figure 2:
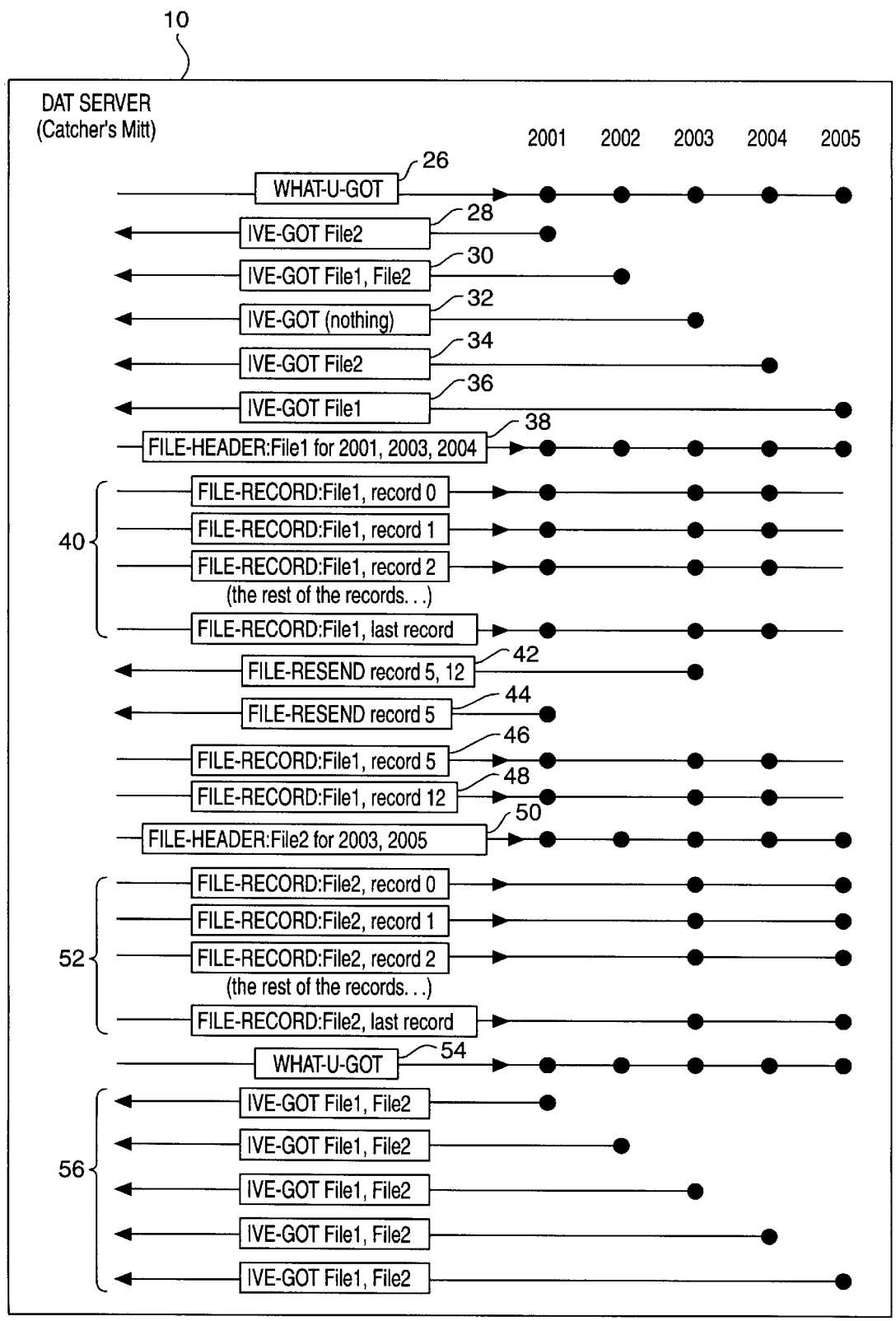
FIG. 2 is a diagram illustrating the communication sequence of the data distribution system and method according to the present invention.

In order to properly distribute data to appropriate network computer locations, a global naming convention is necessary. Because the data distribution system of the present invention is designed to operate both with a NetBIOS transport and on a TCP/IP LAN (using UDP), separate naming conventions are required. The NetBIOS and TCP/IP addressing schemes are as follows:

NetBIOS naming scheme (supports 9000 LAN clients):
  each client has a unique name CMNG_ssxxxx where ss identifies the LAN (e.g., a city abbreviation, such as KC for Kansas City), and xxxx is a sequential identifier >=1000, <=9999 (e.g., the client's telephone extension)
  each client has a group name CMNG_ss0000
  each WAN master has a unique name CMNG_ss00cc where cc is numeric
  each LAN master has a unique name CMNG_ss0ccc where ccc is numeric C to receive data from the WAN master TCP/IP addressing scheme (supports 254 LAN clients):
  each position has a unique IP address aaa.bbb.ccc.ddd
  each position listens for UDP datagrams on a multicast address aaa.bbb.ccc.255 on a specific port (5100, for example)—this is done by creating a socket of type SOCK_DGRAM, using the IPPROTO_UDP protocol
  Each WAN master has a unique IP address (www.xxx.yyy.zzz)
  Each LAN master has an IP address (www.xxx.yyy.vvv) which has the same network address (www.xxx.yyy) as the WAN master. It broadcasts to address aaa.bbb.ccc.255 when sending data to clients on the LAN Turning now to FIG. 2, further details of the system-wide logic flow according to the present invention will be described. The data distribution system 10 of the present invention maintains a table which specifies network addresses of all network computer locations on a particular network. Data distribution system 10 then tracks data distribution to all of these locations, saving information between sessions so that information remains current. Referring to FIG. 2, which is a simplified illustration of the communications sequence according to the present invention, data server 10 initially sends a message 26 entitled WHAT-U-GOT to all network client locations. In the example of FIG. 2, the network includes client locations 2001, 2002, 2003, 2004, and 2005. Each client location then responds to message 26 with IVE-GOT messages. For example, if a client location determines that it has the specified file, but it is a different version of the file, it may request the file by replying that it does not have that file in order to obtain the current version. Specifically in FIG. 2, location 2001 sends message 28 indicating that it currently has File 2. Location 2002 sends IVE-GOT message 30 indicating that it currently has File 1 and File 2. Location 2003 sends a message 32 stating that it has no files. Location 2004 sends a message 34 indicating that it has File 2, while location 2005 indicates that it has only File 1 via message 36.

When a data distribution is to occur, either via a set of conditions that start a distribution automatically or due to user input, data server 10 determines which positions are to receive the data. This determination is made using the network address table discussed above and described in further detail below, as well as user input and previously collected information about the data currently residing at particular network computer locations.

In accordance with the present invention, data distribution system 10 then generates a FILE-HEADER message that indicates the specific data included in the data distribution as well as the network computer locations intended to receive the data distribution. Referring to FIG. 2, file header message 38 indicates that File 1 is to be received by locations 2001, 2003 and 2004. File 1 will only be sent to these three locations because the other two locations in the example, locations 2002 and 2005, previously indicated that they currently have the correct version of File 1. File header message 38 is sent out on the network as a datagram and is received by all client locations. Data server then pauses for a short period to allow the network computer locations to prepare for receiving data. This pause may be necessary if, as described in further detail below, the network location needs to create a transient port or network name which will receive the data.

Each network computer location examines the file header message, decoding the GROUP_INFO member to determine whether data server 10 intends to include the particular location in the following data distribution. The GROUP_INFO member is designed to specify several blocks of network addresses, possibly at specified intervals (for example, only even network addresses). Further details of the GROUP_INFO member as well as other data structures are provided below.

If a network location determines that it should receive the following data, it prepares for receipt, for example, by opening a temporary file. A temporary file should be used (and then renamed to the proper name after successful transfer) so that it does not overwrite existing data until all data has been received and is consistent.

Data server 10 then sends a series of FILE_RECORDS (MSG_FILE_RECORD). For example, in FIG. 2, it can be seen that a series of file records 40 for File 1 are sent to the network and received by network client locations 2001, 2003 and 2004. Depending on the underlying operating system, these file record messages can be paced to allow for multi-tasking to continue without affecting the running applications, or for non-reentrant hardware access. These file records are transmitted to the network sequentially.

As the intended network locations receive the data, each location processes the data (for example, by writing to a file). The intended network locations also examine the record number in each message to determine whether any data has been missed. Data records could be missing due to excessive network activity or could be out of order. In both NetBIOS and UDP/IP, datagrams make a good effort to be received, but they are not guaranteed. The network locations record any missing records, keeping a list of which records it still requires. As data records are received out of order, this list is updated to include additional missing records or to mark earlier records as successfully received. Records that are repeated, possibly due to routers or bridges, or because of a FILE_RESEND request by another client are ignored.

After data server 10 has transmitted all records, it pauses for a short period of time, collecting any FILE-RESEND messages (MSG_FILE_RESEND) from the network computer locations. For example, in FIG. 2, location 2003 transmits a FILE_RESEND message 42 to data server 10 specifying that it did not receive records 5 and 12 of File 1. Similarly, network location 2001 transmits a FILE-RESEND message 44 to data server 10 specifying that it did not receive record 5.

Data server 10 compiles a list of which records must be resent, and then sends these records to the network. As illustrated in FIG. 2, data server 10 transmits file record message 46 containing record 5 of File 1 and file record message 48 containing record 12. Network locations that have received the complete set of data ignore additional (or repeated) records. Thus, in the exemplary embodiment shown in FIG. 2, network location 2004 will ignore the resending of records 5 and 12. The FILE-RESEND cycle may be repeated as necessary. If a particular network location misses too many records, or if it fails to receive any additional records within a certain time period, the network location declares the transmission as failed. The location will then clean up its temporary files and ignore all subsequent data records.

Continuing the communication sequence illustrated in FIG. 2, data server 10 transmits a FILE-HEADER message 50 specifying that File 2 is intended for network locations 2003 and 2005. Data server 10 then transmits a series of FILE-RECORD messages 52 across the network which are received by network locations 2003 and 2005.

Following the completion of the distribution of a particular set of data, data server 10 transmits a WHAT-U-GOT message 54 to all appropriate network locations. Each network location responds back to data server 10 with an IVE-GOT message providing specifics about the data it currently contains (for example, a file name, date of creation, and length). In FIG. 2, it can be seen that each network location 2001–2005 sends an IVE-GOT message 56 to data server 10 specifying that it has File 1 and File 2. Data server 10 can then use the data returned from the network locations in the IVE-GOT messages 56 to determine whether all appropriate locations received the data, and to start a new data distribution cycle if one is required.

Further details will now be provided relating to the various data structures according to the data distribution system and method of the present invention. These data structures are configured in C/C++ format. The various data structures are as follows:

Structures for Messages sent from Data Server to Clients

Structure for message to ask client for information about its current data files:
```
typedef struct tagSTRUCT_WHAT_U_GOT
{
    CMNG_HEADER xHeader; // ucMessageID ==
MSG_WHAT_U_GOT
    WORD    wNumOfGroups; // max MAX_NUM_GROUPS
    WORD    wNumOfFileNames; // max MAX_NUM_DIR_ENTRIES
    GROUP_INFO  xGroup[MAX_NUM_GROUPS];
    FILE_NAME xFileName[MAX_NUM_DIR_ENTRIES];
} STRUCT_WHAT_U_GOT;
```
Structure for message to initiate a file transfer:
```
typedef struct tagSTRUCT_FILE_HEADER
{
    CMNG_HEADER xHeader; // ucMessageID ==
MSG_FILE_HEADER
    WORD        wNumOfGroups; // max MAX_NUM_GROUPS
    WORD        wNumofRecords; // change to 32-bit if needed
    GROUP_INFO  xGroup[MAX_NUM_GROUPS];
    FILE_NAME   xFileName;
    FILE_INFO   xFileInfo;
    DWORD       dwActivationTime;
} STRUCT_FILE HEADER;
```
Structure for message to send partial data for a data transfer:
```
typedef struct tagSTRUCT_FILE_RECORD
{
    CMNG_HEADER xHeader; // ucMessageID ==
MSG_FILE_RECORD
    long int 1RecNum; // -1 to indicate download aborted
    FILE_DATA xFileData;
} STRUCT_FILE_RECORD;
```

Structures for Messages sent from Clients to Data Server

Structure for message to tell Server about the data files on this client:
```
typedef struct tagSTRUCT_IVE_GOT
{
    CMNG_HEADER  xHeader; // ucMessageID == MSG_IVE_GOT
    WORD         wNumOfEntries; // max
                 MAX_NUM_DIR_ENTRIES
    WORD         wFiller;
    FILE_NAME    xFileName[MAX_NUM_DIR_ENTRIES];
    FILE_INFO    xCurrFile[MAX_NUM_DIR_ENTRIES];
    FILE_INFO    xNewFile[MAX_NUM_DIR_ENTRIES];
    FILE_INFO    xOldFile[MAX_NUM_DIR_ENTRIES];
} STRUCT_IVE_GOT;
```

Structure for message to request that Server resend one or more records from the data file currently being distributed:
```
typedef struct tagSTRUCT_FILE_RESEND
{
    CMNG_HEADER  xHeader;       // ucMessageID
MSG_FILE_RESEND
    WORD         wNumberOfMissingRecords;
    WORD         wMissingRecords[MAX_MISSING_RECORDS];
} STRUCT_FILE_RESEND;
```

Structures and Data Types for Members of above Message Structures

```
typedef struct tagCMNG_HEADER
{
    BYTE        ucGroupID; // MSG_GROUP_CMNG (message
                class)
    BYTE        ucMessageID; // == MSG_*
    BYTE        ucMessageVer; == version number of THIS
                message
    BYTE        ucNetType; // NETTYPE_NETBIOS or
                NETTYPE_IP
    NET_ADDRESS xWhoFrom; // originator of message
    SEQ_NUM     xSeqNum; // time when CMNG initiated
                message set
} CMNG_HEADER;
typedef struct tagFILE_INFO
{
    time_t      lDateAndTimeStamp;
    long        lFileLength;
    BYTE        ucAttributes;
    BYTE        ucFlags; // start/end distr., "activate now"
    BYTE        ucFiller[2]
} FILE_INFO;
typedef struct tagGROUP_INFO
{
    NET_ADDRESS xStartAddr;
    WORD        wIncrement;
    WORD        wNumberConsecutiveEntries;
} GROUP_INFO;
typedef union tagNET_ADDRESS
{
// this is a generic address that supports IP (32-bit) and NetBIOS
    NB_ADDR     xNBAddr;
    IP_ADDR     xIpAddr;
} NET_ADDRESS;
typedef union tagIP_ADDR
{
    DWORD       dwIpAddr;
    BYTE        ucIpAddr[4];
} IP_ADDR;
typedef struct tagNB_ADDR
{
    WORD        wPhoneExtension; //1000+ for client,
                0–999 for CMNG
    char        sCityID[2];
} NB_ADDR;
typedef unsigned char   BYTE; // 8-bit
```

-continued

```
typedef unsigned short int    WORD; // 16-bit
typedef unsigned long int     DWORD; // 32-bit
typedef BYTE                  FILE_DATA[MAX_DATA_LEN];
typedef BYTE                  FILE_NAME[16];
typedef time_t                SEQ_NUM;
```

Constant Definitions for Members of the above Structures

```
#define MSG_GROUP_CMNG        0xf8    // all CMNG messages
                                      have this value
#define MSG_WHAT_U_GOT        0x01    // server --> client
#define MSG_IVE_GOT           0x11    // response to
                                      MSG_WHAT_U_GOT
#define MSG_FILE_HEADER       0x02    // server --> client
#define MSG_FILE_RECORD       0x03    // server --> client
#define MSG_FILE_RESEND       0x14    // request from client to
                                      resend record(s)
#define MAX_NUM_GROUPS        10
#define MAX_NUM_DIR_ENTRIES   10
#define MAX_MISSING_RECORDS   20      // for the client
                                      before aborting
#define MAX_DATA_LEN          512     // may depend on
                                      network protocol
```

Protocol

It will be appreciated by those skilled in the art that the above computer program code segments are to be employed to configure a general purpose microprocessor to create specific logic circuits. Further, these computer-executable program code segments are to be stored on a computer-readable memory so that the memory is capable of implementing data distribution according to the present invention. Thus, the computer-readable memory of the present invention includes a data structure for determining which of the multiple network computer locations are to receive a data distribution. The computer memory also includes file header structure which generates the file header messages described above.

The computer-readable memory further includes a file record structure for transmitting the data distribution to the network such that the intended network computer locations are capable of receiving the data distribution.

As noted above, in the illustrated implementation of the present invention, lists of client addresses are stored as a collection of range specifiers. This greatly simplifies setting up and managing the list of network locations. For example, a NetBIOS implementation might contain 300 positions, grouped in blocks of 50 positions, possibly by physical location within a site. One implementation may be to identify these groups as Red Room, Blue Room, etc. For fault tolerance, each "Room" is on a separate physical LAN, and these LANs are connected via bridges. An example listing of the network addresses for a NetBIOS network would be (see the GROUP_INFO structure):

4300/KC/1/50
4400/KC/1/50
4450/KC/1/50
5000/KC/1/50
5050/KC/1/50
9000/KC/2/50 (note '2' to indicate "every other" address)

which includes all of the following NetBIOS addresses (one per client):

CMNG_KC4300, CMNG_KC4301, . . . , CMNG_KC4349 (50 positions)
CMNG_KC4400, CMNG_KC4401, . . . , CMNG_KC4449 (50 positions)
CMNG_KC4450, CMNG_KC4451, . . . , CMNG_KC4499 (50 positions)
CMNG_KC5000, CMNG_KC5001, . . . , CMNG_KC5049 (50 positions)
CMNG_KC5050, CMNG_KC5051, . . . , CMNG_KC5099 (50 positions)
CMNG_KC9000, CMNG_KC9002, . . . , CMNG_KC9098 (50 positions, by 2's)

A similar implementation, with 150 positions, using IP addresses:

144.145.146.005/1/50
144.145.146.070/1/50
144.145.146.133/1/50 which includes all of the following IP addresses (one per client):

144.145.146.005, 144.145.146.006, . . . , 144.145.146.054 (50 positions)
144.145.146.070, 144.145.146.071, . . . , 144.145.146.119 (50 positions)
144.145.146.133, 144.145.146.134, . . . , 144.145.146.182 (50 positions)

It should be noted that all network locations may not be available at all times; some may not exist or others may be disabled for maintenance. In the illustrated implementation of the present invention, the distribution system would indicate these positions as unavailable, which would help alert technicians about potential hardware problems.

Figure 3:
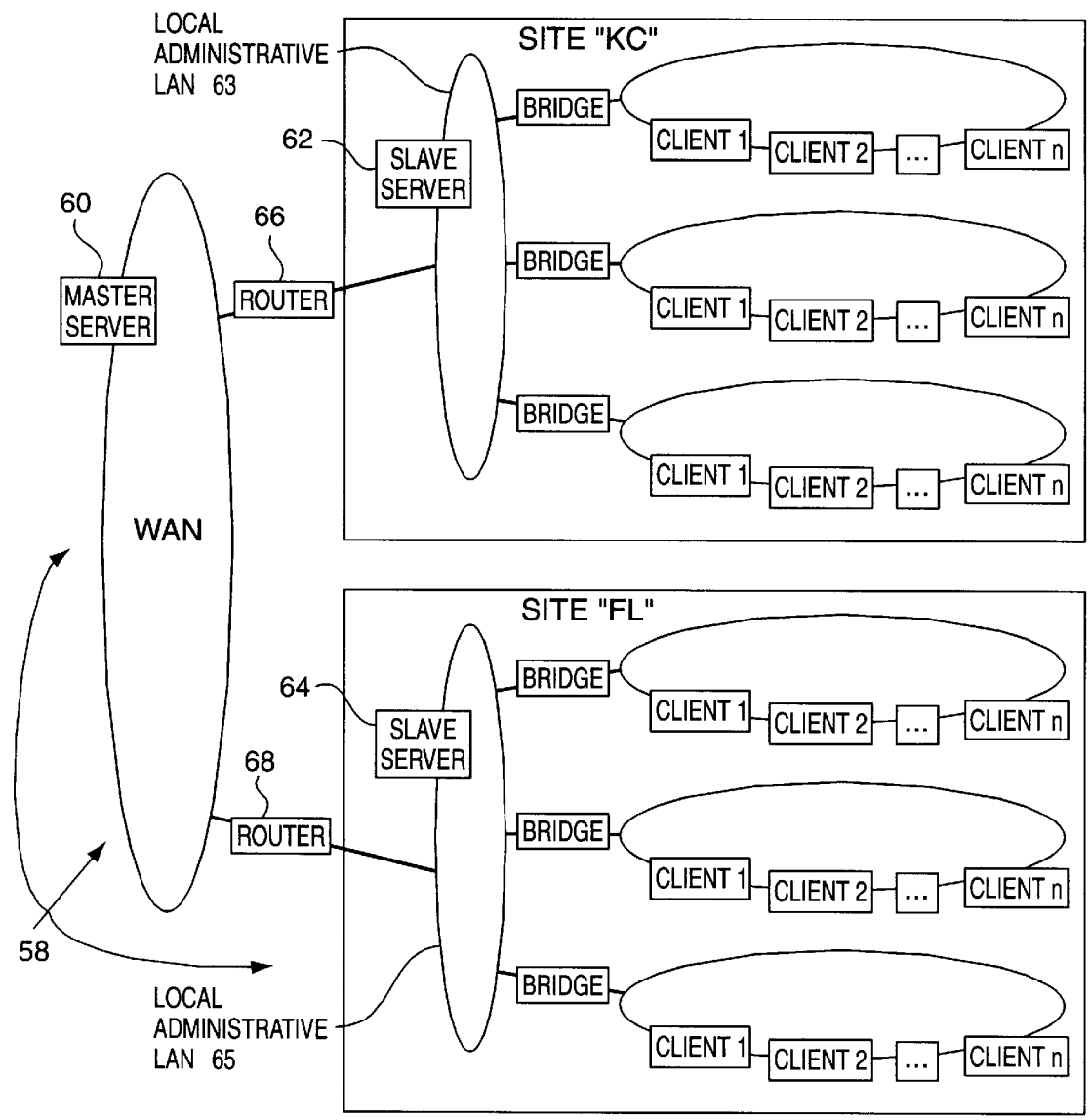
FIG. 3 illustrates use of the data distribution system and method of the present invention in a wide area network environment.

FIG. 3 illustrates use of the data distribution system and method of the present invention in a wide-area network (WAN) configuration generally designated by reference numeral 58. In WAN configuration 58, a master server 60 distributes files to sub-server 62 in local administrative LAN 63 and subserver 64 in local administrative LAN 65 via routers 66 and 68, respectively. As can be seen in FIG. 3, the WAN configuration 58 encompasses two sites including SITE "KC" and SITE "FL". It will be appreciated that the present invention is not limited to the use of only two sites within a WAN configuration, and could include additional sites connected to WAN 58. Sub-servers 62 and 64 then distribute the files to all client locations at their respective sites in the manner illustrated above.

Depending on the processing capabilities of a particular network, it may be desirable to have unwanted messages ignored at a lower level in network processing. In the illustrated embodiment, the application determines whether or not it wants to process a particular message. In order to prevent unwanted messages from reaching the application, a client location should provide a transient data connection that is "listening" only when data server 10 has informed it that data following is of interest to the particular client location. This can be done in two different ways, depending on the network transport. For NetBIOS, the client adds another group name (CMNG_ss0001, for example), and posts a datagram receive on it. When the data of interest has been received, the name is deleted. For IP, the client creates a new socket, and binds it to listen for datagrams on a different port (5101, for example). Again, when the data of interest has been received, the socket is closed.

Various IP networks may have submasks that provide for different broadcast addresses. The example above is intended to be used on an 8-bit subnetwork, using a mask of 255.255.255.0.

As mentioned above, data distribution system 10 of the present invention can also contain transaction logic. For example, the distribution system of the present invention can be used to distribute program and data files to clients on a LAN who all run the same software (e.g., a telephone operator center). Since different versions of programs and data may not operate intermixed, it is important to delay activation of a distribution until all appropriate files have been received. To accomplish this, the present invention sends a special message (a MSG_FILE_HEADER message with a FILE_START_DISTRO indication, such as a file name of STARTDIS.$$$) before the first of a series of files is distributed. When the client location receives this message, it sets a semaphore specifying that a distribution is in progress and clears a semaphore (if any) that specifies that a complete distribution has occurred. One technique is to create/delete special files (or directories), such as STARTDIS.$$$ and ENDDIS.$$$. File distribution then proceeds normally for a complete series of files. The client may ask for missing records in a particular file with MSG_FILE_RESEND, but if a timeout occurs or for some other reason the client fails to receive a particular file, it clears the distribution-in-progress semaphore.

When data server 10 has completed the transmission of all files, it sends a special message (a MSG_FILE_HEADER message with a FILE_END_DISTRO indication,such as a file name of ENDDIS.$$$). When the client receives this message, it determines whether it has received all files (by examining the distribution-in-progress semaphore). If the semaphore is still set, then the distribution was successful. The client then can set the distribution-complete semaphore and clear the distribution-in-progress semaphore. At this point, additional software on the client can determine that a full distribution has occurred and activate the received files when appropriate.

In keeping with the present invention, to allow a distribution to occur quickly and in the background, files to be distributed by data server 10 can be compressed and grouped together. This minimizes the number of files to distribute and helps provide a good transmission since the compression software can perform integrity checks as it decompresses. To decrease the downtime, the compressed files should be decompressed in a temporary directory while maintaining the directory structure. Then, when the client is able to activate the new version of files, it performs a MOVE operation (as opposed to a COPY) on each file which is extremely fast since it only needs to modify information in the directory and does not actually move the data. One implementation of this might include /NEW, /OLD, and /CUR directories which contain the compressed distribution files.

Files which are received are placed in the /NEW directory and decompressed into the /STAGING directory. When all of the files have been moved from the /STAGING directory to corresponding directories on the root (/) directory, the files in /OLD are deleted, the files in /CUR are moved to /OLD, and the files in /NEW are moved to /CUR. It should be noted that this particular implementation requires multiple copies of the complete system. However, several advantages of this system include background decompression, fast activation, and fast backing-out of a bad version (by moving the /OLD files to the /NEW directory, and starting an activation process).

It should also be understood that the MSG_IVE_GOT responses to a MSG_WHAT_U_GOT message are all sent by the client positions to the same data server. Since these messages are sent as unguaranteed datagrams, it may be necessary for client locations to stagger their responses by pausing for a short period of time (for example, a certain number of milliseconds, based on the client's network address).

As is evident from the foregoing description, the present invention provides a system and method for distributing a single copy of data to a multiple number of intended network locations simultaneously rather than one at a time. This has the significant advantage of increasing speed and decreasing the amount of bandwidth required for data transmission. Additionally, the present invention can be implemented on both local area networks and wide area networks.

While this invention has been described with an emphasis upon preferred embodiments, it will be understood by those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

I claim:

1. A method for distributing data to multiple computer locations associated with a network, the method comprising the steps of:

(a) determining which of the multiple network computer locations are to receive a data distribution;

(b) generating a first message, said first message identifying the data comprising the data distribution, and said first message identifying the network computer locations intended to receive the data distribution;

(c) transmitting the first message to the network for examination by the multiple network computer locations;

(d) examining the first message at the multiple network computer locations so that each network computer location can determine whether it is an intended location for receiving the data distribution;

(e) transmitting the data distribution to the network for receipt by one or more of the intended network computer locations; and (f) receiving the data distribution at one or more of the intended network computer locations.

2. The method as defined in claim 1 further comprising the steps of:

(g) transmitting another message to the network requesting all of the intended network computer locations to indicate the status of the receipt of the data distribution;

(h) receiving individual responses from the network computer locations indicating the status of the receipt of the data distributions;

(i) transmitting data to the network, based on said individual responses, that was not received by the network computer locations; and (j) repeating steps (f) through (i) until the data distribution is complete.

3. The method as defined in claim 1 wherein step (a) comprises:

transmitting an initial message across the network requesting information relating to the status of the current data files of the network computer locations, and receiving individual responses from the network computer locations relating to the status of the current data files.

4. The method as defined in claim 1 wherein the data distribution comprises at least one file header and at least one data file including at least one file record, wherein the file header comprises the first message.

5. The method as defined in claim 4 wherein the data distribution further comprises program files.

6. The method as defined in claim 1 wherein the network comprises a local area network.

7. The method as defined in claim 1 wherein the network comprises a wide area network.

8. The method as defined in claim 1 further comprising the step of maintaining a data table including network addresses of all network computer locations associated with the network.

9. The method as defined in claim 1 further comprising the step of tracking successive data distributions to the network computer locations to maintain current information relating to the data files of the network computer locations.

10. A computer-readable memory having stored therein computer-executable program code for distributing data to multiple computer locations associated with a network, the computer-readable memory comprising:

structure for determining which of the multiple network computer locations are to receive a data distribution;

message announcement structure for generating and transmitting to the network a first message, said first message identifying the data that comprises the data distribution and identifying the network computer locations intended to receive the data distribution, wherein the multiple network computer locations examine the first message so that each network computer location can determine whether it is an intended location for receiving the data distribution; and file record structure for transmitting the data distribution to the network after transmission of the first message, such that a plurality of the multiple network computer locations are capable of receiving the data distribution, and wherein one or more intended network computer locations receive the data distribution as specified in the first message.

11. The computer-readable memory as defined in claim 10 further comprising structure for indicating the status of data files on individual network computer locations.

12. The computer-readable memory as defined in claim 10 further comprising resend structure for requesting that missing data from the data distribution be resent.

13. The computer-readable memory as defined in claim 12 wherein the intended network computer locations maintain individual listings of the data received during the data distribution to determine whether certain data was not received.

14. The computer-readable memory as defined in claim 10 wherein the data distribution comprises a single copy of data including at least one file header and at least one data file having at least one file record, the single copy being accessible by a plurality of the network computer locations.

15. The computer-readable memory as defined in claim 14 wherein the data distribution further comprises program files.

16. The computer-readable memory as defined in claim 10 wherein the network comprises a local area network.

17. The computer-readable memory as defined in claim 10 wherein the network comprises a wide area network.

18. The computer-readable memory as defined in claim 10 wherein the structure for determining comprises structure for transmitting a message across the network requesting information indicating the status of current data files on individual network computer locations, and structure for receiving individual responses from the network computer locations relating to the status of the current data files.

19. The computer-readable memory as defined in claim 10 wherein the computer-executable program code maintains a data table which includes network addresses of all network computer locations associated with the network.

20. The computer-readable memory as defined in claim 10 further comprising structure for tracking successive data distributions to the network computer locations so that said memory maintains current information relating to the data files of the network computer locations.

21. A data distribution system for distributing data to multiple computer locations associated with a network, the data distribution system comprising:

means for determining which of the multiple network computer locations are to receive a data distribution;

means for generating a first message, said first message identifying the data that comprises the data distribution and identifying the network computer locations intended to receive the data distribution;

means for transmitting the first message across the network, wherein the multiple network locations determine whether they are intended locations for receiving the data distribution based the first message means for transmitting a single copy of the data distribution across the network after transmission of the first message across the network, such that each of the multiple network computer locations is capable of receiving the data distribution and one or more of the intended network computer locations can accept the data distribution.

22. The data distribution system as defined in claim 21 wherein the data distribution comprises at least one file containing at least one record.

23. The data distribution system as defined in claim 22 wherein the file of the data distribution comprises a file header and a plurality of file records, and wherein the file header comprises the first message and includes destination, origination, and identification information.

24. The data distribution system as defined in claim 21 wherein the network comprises a local area network.

25. The data distribution system as defined in claim 21 wherein the network comprises a wide area network.

26. A computer network adapted to distribute data, the network comprising:

a plurality of client computers connected to the network; and a data server adapted to communicate with the plurality of client computers; the data server including:

means for determining which of the plurality of client computers are to receive a data distribution;

means for generating a first message, said first message identifying the data that comprises the data distribution and identifying which of the plurality of client computers are intended to receive the data distribution, means for transmitting the first message across the network, wherein the plurality of client computers examine the first message so that the client computers can determine whether they are intended locations for receiving the data distribution; and means for transmitting a single copy of the data distribution across the network after transmission of the first message across the network, such that the plurality of client computers are capable of receiving the data distribution, wherein one or more of the plurality of client computers receive the data distribution as indicated in the first message.

27. The computer network as defined in claim 26 wherein the network comprises a local area network.

28. The computer network as defined in claim 26 wherein the network comprises a wide area network.

29. The computer network as defined in claim 28 wherein the data server comprises a master server and one or more sub-servers each associated with a local area network of client computers, and wherein the sub-servers receive the data distribution from the master server and communicate said distribution to a corresponding local area network of client computers.

30. The computer network as defined in claim 26 wherein the data distribution comprises a single copy of data including at least one file header and at least one data file having at least one file record, the single copy being accessible by the plurality of client computers.

* * * * *